US011765300B1

(12) United States Patent
Balusamy et al.

(10) Patent No.: US 11,765,300 B1
(45) Date of Patent: Sep. 19, 2023

(54) METHODS AND SYSTEMS FOR IDENTIFYING BLANK SPACES IN DOCUMENTS FOR EMBEDDING IR MARKS

(71) Applicant: XEROX CORPORATION, Norwalk, CT (US)

(72) Inventors: Packiya Lakshmi Balusamy, Chennai (IN); Ravindranath Mannuru, Kadapa (IN); Haripriya Chandran, Kulathur Chal (IN)

(73) Assignee: XEROX CORPORATION, Norwalk, CT (US)

(*) Notice: Subject to any disclaimer, the term of this patent is extended or adjusted under 35 U.S.C. 154(b) by 0 days.

(21) Appl. No.: 17/880,752

(22) Filed: Aug. 4, 2022

(51) Int. Cl.
*H04N 1/32* (2006.01)
*H04N 1/00* (2006.01)

(52) U.S. Cl.
CPC ..... *H04N 1/32229* (2013.01); *H04N 1/00413* (2013.01)

(58) Field of Classification Search
CPC .............................................. H04N 1/32229
USPC ............................................. 358/3.28
See application file for complete search history.

(56) References Cited

U.S. PATENT DOCUMENTS

2007/0092281 A1* 4/2007 Saito .................... G03G 21/02 399/79
2009/0310184 A1* 12/2009 Suzuki ................. H04N 1/387 358/1.18
2012/0251715 A1* 10/2012 Dalal ................... B42D 25/21 427/256
2014/0022603 A1* 1/2014 Eschbach ........... H04N 1/32309 358/3.28

FOREIGN PATENT DOCUMENTS

EP 2144188 B1 4/2016

* cited by examiner

*Primary Examiner* — Jacky X Zheng

(57) ABSTRACT

The present disclosure discloses methods and systems for identifying blank spaces in a document for embedding an Infrared (IR) mark in the document. The method includes receiving the document for printing from the user. A user interface is provided to the user that allows the user to select a pre-defined option. Upon selection of the pre-defined option, inputs from the user on the IR mark is received. Based on the inputs from the user, a specified portion of the document is extracted for processing. Then, blank spaces are checked in the extracted portion based on a size of the IR mark to be embedded in the document. Based on the check, the IR mark is embedded in the identified blank space. An output document is outputted/printed including the IR mark in the specified portion of the document. The IR mark is embedded such that there is no content loss.

22 Claims, 12 Drawing Sheets

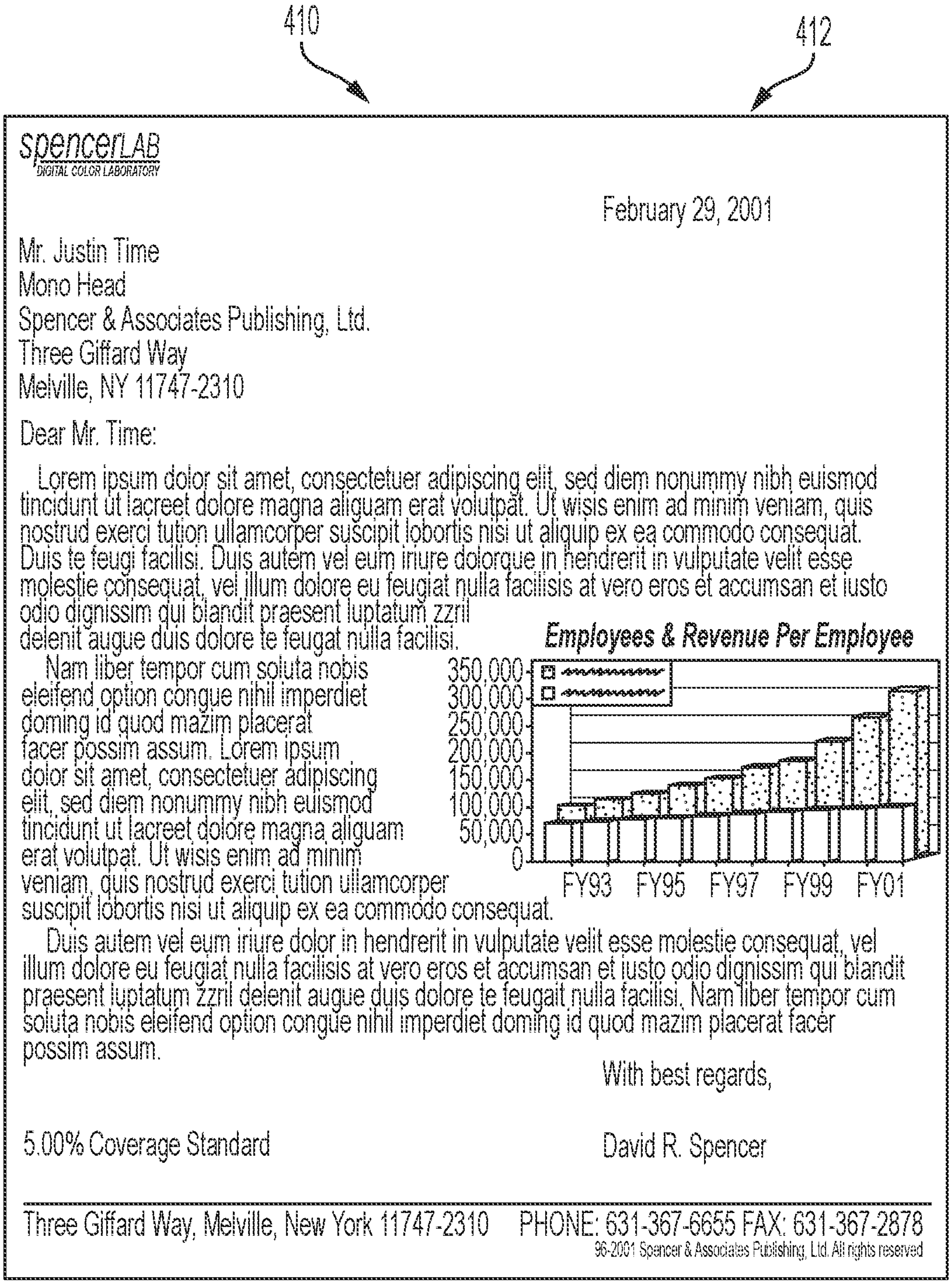

spencerLAB
DIGITAL COLOR LABORATORY

February 29, 2001

Mr. Justin Time
Mono Head
Spencer & Associates Publishing, Ltd.
Three Giffard Way
Melville, NY 11747-2310

Dear Mr. Time:

Lorem ipsum dolor sit amet, consectetuer adipiscing elit, sed diem nonummy nibh euismod tincidunt ut lacreet dolore magna aliguam erat volutpat. Ut wisis enim ad minim veniam, quis nostrud exerci tution ullamcorper suscipit lobortis nisi ut aliquip ex ea commodo consequat. Duis te feugi facilisi. Duis autem vel eum iriure dolorque in hendrerit in vulputate velit esse molestie consequat, vel illum dolore eu feugiat nulla facilisis at vero eros et accumsan et iusto odio dignissim qui blandit praesent luptatum zzril delenit augue duis dolore te feugat nulla facilisi.

Nam liber tempor cum soluta nobis eleifend option congue nihil imperdiet doming id quod mazim placerat facer possim assum. Lorem ipsum dolor sit amet, consectetuer adipiscing elit, sed diem nonummy nibh euismod tincidunt ut lacreet dolore magna aliguam erat volutpat. Ut wisis enim ad minim veniam, quis nostrud exerci tution ullamcorper suscipit lobortis nisi ut aliquip ex ea commodo consequat.

Duis autem vel eum iriure dolor in hendrerit in vulputate velit esse molestie consequat, vel illum dolore eu feugiat nulla facilisis at vero eros et accumsan et iusto odio dignissim qui blandit praesent luptatum zzril delenit augue duis dolore te feugait nulla facilisi. Nam liber tempor cum soluta nobis eleifend option congue nihil imperdiet doming id quod mazim placerat facer possim assum.

With best regards, 5.00% Coverage Standard

David R. Spencer

Three Giffard Way, Melville, New York 11747-2310 PHONE: 631-367-6655 FAX: 631-367-2878
96-2001 Spencer & Associates Publishing, Ltd. All rights reserved

FIG. 4B

METHODS AND SYSTEMS FOR IDENTIFYING BLANK SPACES IN DOCUMENTS FOR EMBEDDING IR MARKS

TECHNICAL FIELD

The present disclosure relates to the field of document security. More specifically, the disclosure relates to methods and systems for identifying blank spaces in documents for embedding IR marks in the documents.

BACKGROUND

Securing a document with special marks such as IR marks is very popular as IR marks offer an enhanced security in imaging. IR mark is a security feature that allows user or multi-function device to classify whether a document is a confidential document or not and further helps classifying whether the document is a genuine document or not. The IR mark feature is a visual element where information is embedded/hidden in it for naked eye. When IR feature is enabled at multi-function devices, a desired IR mark is printed on each page of the document. The IR mark can be positioned/printed in any corner of the document such as top right corner, bottom right corner of the document. Sometimes, there are situations when there is important content on a corner of a page of the document and the user wishes to position IR mark in that corner. In such cases, while printing the IR mark in the desired corner, the existing content in the printed document gets cropped/disturbed, This eventually leads to loss of content such as logo, titles, date, author information, etc. In other words, the already existing content gets overwritten due to inclusion of the IR mark. In this light, there is need for methods and systems that minimize content loss or avoid content loss while embedding IR mark in documents.

SUMMARY

According to aspects illustrated herein, a method for identifying blank spaces in a document for embedding an Infrared (IR) mark in the document, is disclosed. The method includes receiving the document from a user for at least one pre-defined operation. A user interface is provided to the user that allows the user to select a pre-defined option such as check content before embedding IR mark. Upon selection of the pre-defined option, inputs from the user on the IR mark is received. Based on the inputs from the user, a specified portion of the document is extracted for processing. Then, blank spaces are checked in the extracted portion based on a size of the IR mark to be embedded in the document. Based on the check, the IR mark is embedded in the identified blank spaces in the specified portion of the document. Finally, a final document is output/printed including the IR mark in the specified portion of the document.

According to aspects illustrated herein, a multi-function device for identifying blank spaces in a document for embedding an Infrared (IR) mark is disclosed. The multi-function device includes a user interface, a controller, and an output module. The user interface allows a user to select a pre-defined option, wherein the pre-defined option allows the user to check for content loss before embedding the IR mark in the document and further allows the user to provide inputs related to IR mark; The controller is for: receiving the document from the user for at least one pre-defined operation; based on the selection of the pre-defined option, receiving inputs from the user on the IR mark; extracting a specified portion of the document for processing; checking for the blank spaces in the extracted portion based on a size of the IR mark to be embedded in the document; based on the check, embedding the IR mark in the identified blank spaces. The output module outputs a final document including the IR mark in the specified portion of the document.

According to further aspects illustrated herein, a method for identifying blank spaces in a document for embedding an Infrared (IR) mark is disclosed. The method includes receiving the document for printing from a user. A user interface is provided to the user interface that allows the user: i) to select a pre-defined option for checking blank spaces in one or more corners of the document, and ii) to provide IR mark-related input. Based on the user's input, a specified corner of the document is extracted for further processing. Then, a number of white pixels row-wise is calculated in the specified corner of the document and a number of white pixels column-wise is calculated in the specified corner of the document. Based on the above calculations, it is identified whether the extracted corner includes blank spaces for embedding the IR mark. Based on the identification, the IR mark is embedded in the specified corner of the document. Finally, a printed document is output including the IR mark in the specified corner of the document.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

FIGS. 4A-4F are exemplary snapshots, in accordance with an embodiment of the present disclosure.

DESCRIPTION

Figure 1:
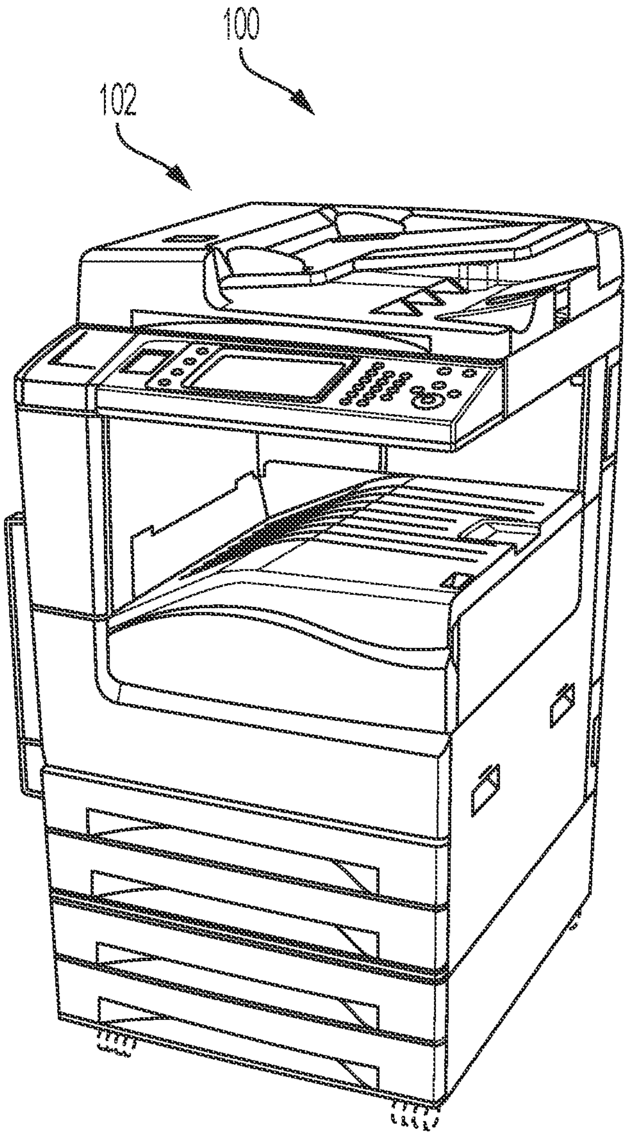
FIG. 1 shows an exemplary environment in which various embodiments of the present disclosure can be practiced.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

In various embodiments of the present disclosure, definitions of one or more terms that will be used in the document are provided below. For a person skilled in the art, it is understood that the definitions are provided just for the sake of clarity and are intended to include more examples in addition to the examples provided below.

The term "multi-function device" is a single device or a combination of multiple devices, to perform one or more functions such as, but not limited to, printing, scanning, copying, imaging, or the like. The multi-function device may include software, hardware, firmware, or a combination thereof. In the context of the current disclosure, the multi-function device identifies blank spaces in documents for/before embedding an IR (Infrared) mark in the documents. The blank spaces are identified before inclusion of the IR mark to ensure no existing content in the documents is lost/hidden/cropped/disturbed because of the IR mark.

The term "pre-defined option" refers to an option included in a user interface that allows the user to check for blank spaces for/before embedding the IR mark and/or to check for any content loss because of inclusion of the IR mark.

The term "at least one pre-defined operation" refers to an imaging operation to be performed on the document. Few non-limiting examples include printing, copying, or other imaging operations. The pre-defined operation is performed based on a requirement, preference, command, and/or input from the user.

The term "document" refers to any document having confidential content or otherwise confidential for individual users, organizations, nations, or the like. The document may include content in the form of text, image, graphics, or a combination thereof. Various examples of such documents may be, but not limited to, cheques, legal documents, bank bonds, research data, project documents, contract documents, prescriptions, coupons, tickets, invoices, or disclosure documents. These are few examples but there can be any other documents. The document is submitted for printing. In such cases, the document submitted is in digital form i.e., electronic version and the output is in physical form such as printed on paper. In other implementations, the document can be submitted for copying. In such cases, the document submitted is in the physical form such as printed on paper and the output is in digital form, which is then printed.

The term "IR mark" refers to a mark added/printed/embedded in the document to ensure its authenticity/genuineness/originality/confidentiality. The IR mark can be in the form of text, or image. The IR mark can be embedded in any corner of the document such as top right corner, top left corner, bottom left corner or on the bottom right corner of the document. These are few examples, but the IR mark can be embedded in any other desired portion of the document. The IR mark can be embedded on a single page of the submitted document or all pages of the document.

The term "IR security patch" defines a pattern to cover/hide the IR mark such that it is not visible to naked eyes. The IR patch may be solid patterns, dots pattern, solid color pattern, or the like.

The term "specified portion" refers to a portion of the document specified by a user, where the IR mark is to be embedded and/or for blank spaces identification. For example, the specified portion can be a corner of the document such as top right corner, top left corner, bottom right corner, or bottom left corner. These are just few examples, but the specified portion can include other portions of the document, where the IR mark can be included in the document, The specified portion can be termed as desired/required portion of the document.

The term "other portion" refers to portions of the document not specified by the user, for example, for blank spaces identification, Such other portions can include any corners of the documents or other sections where the IR mark can be included.

The term "blank spaces" refer to space in the document, where no content is present in the document. In some implementations, the blank spaces may refer to a space having less content in the document and/or having content which may not be important for the user submitting the document and/or organization. The blank spaces are identified/determined in accordance with a size of IR mark.

The term "required blank space" refers to space sufficient for including the IR mark. The required blank space is determined based on a size of the IR mark. For example, if there is blank space in the top right corner of the document but the blank space is less than the size of the IR mark, then it is considered that there is no required blank space. As a result, the IR mark cannot be embedded in the top right corner of the document. In another example, if there is blank space in the top right corner of the document but the blank space is greater than or equal to size of the IR mark, then it is considered that there is required blank space. As a result, the IR mark can be embedded in the top right corner.

The term "content loss" refers to include content disturbed, content cropped content removed, content hidden, other types of content modification due to the inclusion of IR mark.

The term "user" refers to any user who submits the document at the multi-function device and/or who wishes to add IR mark in the document. The user can be any user of an organization and/or can be an admin user.

The term "computing device" refers to a device that the user typically uses for his day-to-day work, submitting print commands and other purposes. Examples of the computing device include, but are not limited to, a personal computer, a desktop, a laptop, a mobile phone, a mobile device, a tablet, a Personal Digital Assistant (PDA), a smart-phone or any other device capable of data communication and/or print submission. The computing device includes a print driver application that allows the user to submit documents for printing, one or more print parameters, and so on.

Overview

The present disclosure discloses methods and systems for identifying blank spaces in documents for embedding IR marks in the documents, specifically, before embedding the IR mark in the documents. The methods and systems provide a pre-defined option that allows a user to check content in desired portion before embedding the IR mark. The methods and systems identify blank space in the desired portion of the document. Based on the blank space identification/detection, the methods and systems embed the IR mark in the document. For example, if there is enough blank space in the desired portion of the document, the methods and systems embed the IR mark in the document in the desired portion of the document. But if there is not enough blank space in the desired portion or if there is no blank space in the desired portion, the methods and systems calculate content loss and inform the user about the calculated content loss. The user can then decide whether he still wishes to include the IR mark in the desired portion. This way, the methods and systems minimize content loss or avoid content loss while embedding IR mark in the documents.

The present disclosure can be implemented for jobs such as print jobs. The disclosure can be extended to other jobs such as copy jobs, where copy jobs are to be printed along with IR mark.

Exemplary Environment

FIG. 1 shows an exemplary environment 100 in which various embodiments of the disclosure can be practiced. The environment 100 includes a multi-function device 102 that provides one or more functionalities such as printing, scanning, imaging, copying, and so on. The multi-function device 102 as shown is just one example but the environment 100 may include a printer, a copier, or any devices with printing and/or copying functionalities. In context of the present disclosure, the multi-function device 102 identifies blank space in a document submitted at the multi-function device 102 for embedding an IR mark in the document. Specifically, the multi-function device 102 identifies blank space in the document submitted at the multi-function device 102 before embedding the IR mark so that any content loss can be avoided.

In context of the current disclosure, the user wishes to add an IR mark in the document, The IR mark may be a text-based security mark. In one example, the IR mark includes alphabets, numbers, special characters, or a combination thereof. The IR mark may represent a name of an organization associated with the document, for example, college or university name. In another example, the IR mark may be a text/phrase to indicate confidentiality of the document. Some exemplary IR marks include, "confidential", "secure", "protected", "confidential and privileged" and so on. The IR mark is included within an IR security patch. The IR mark can be printed on first page or all pages of the document or specific pages of the document based on the requirement.

To begin with, a user submits a document at the multi-function device 102. The document includes content in the form of text, image, graphics, or a combination thereof. The document can be in any desired format such as PDF, MS word, other known formats or later developed formats. The document can be a single page document or a multi-page document. The document is submitted for printing at the multi-function device 102. But the user can submit the document for copying purpose at the multi-function device 102. In such scenarios, the submitted document physical form. For easy discussion, the document submitted is for printing.

The user can submit the document for printing using a computing device, specifically, via a print driver of the computing device (although not shown). The user can submit the document for printing using a mobile device or other computing devices such as laptop, desktop computer, personal digital assistant (PDA). In some implementations, the user can submit the document for printing via a portable storage device, cloud location, network location, server location or the like. In other implementations, the user can submit the document directly at the multi-function device 102 such as via a memory of the multi-function device 102. This way, the user can submit the document at the multi-function device 102 for printing.

In implementation, the user submits the document for printing at the multi-function device 102. Along with this, the user submits one or more print attributes for printing such as destination, black & white, orientation, number of pages, number of copies, or the like. After submitting the document at the mufti-function device 102, a user interface is provided/shown to the user at the multi-function device 102. The user interface allows the user to provide IR mark inputs such as location on page, job for which he wishes to apply IR mark, or the like. In context of the current disclosure, the user interface includes a pre-defined option that allows the user to check content before IR mark. The option allows the user to check whether the location of a page where the user wishes to embed IR mark includes content or not. The selection of the option allows the user to take an informed decision. Upon selection of the option, the multi-function device 102, extracts a desired portion of the document such as top right corner, identifies blank spaces in the extracted portion, and based on the blank spaces, embeds the IR mark in the document. Finally, the multi-function device 102 prints the document including the IR mark such that already included content in the document is not lost. This way, the multi-function device 102 manages embedding the IR mark in the documents. More implementation and structural details will be discussed below in conjunction with FIG. 2.

In case the document is submitted for printing, the multi-function device 102 analyses the document content and generates image data. The multi-function device 102 performs the blank spaces identification on the generated image data. The image data refers to raw pixel data generated upon corresponding Page Description Language (PDL) interpreter such as Postscript and PCL. The image data refers to intermediate processed output of the document submitted for printing. Post identifying the blank spaces in the intermediate processed image data, the multi-function device 102 embeds the IR mark in the image data and finally performs all image processing techniques and generates a final marked output for printing in printer understandable format.

The methods and systems as discussed above can be implemented for print jobs and copy jobs.

Exemplary System

Figure 2:
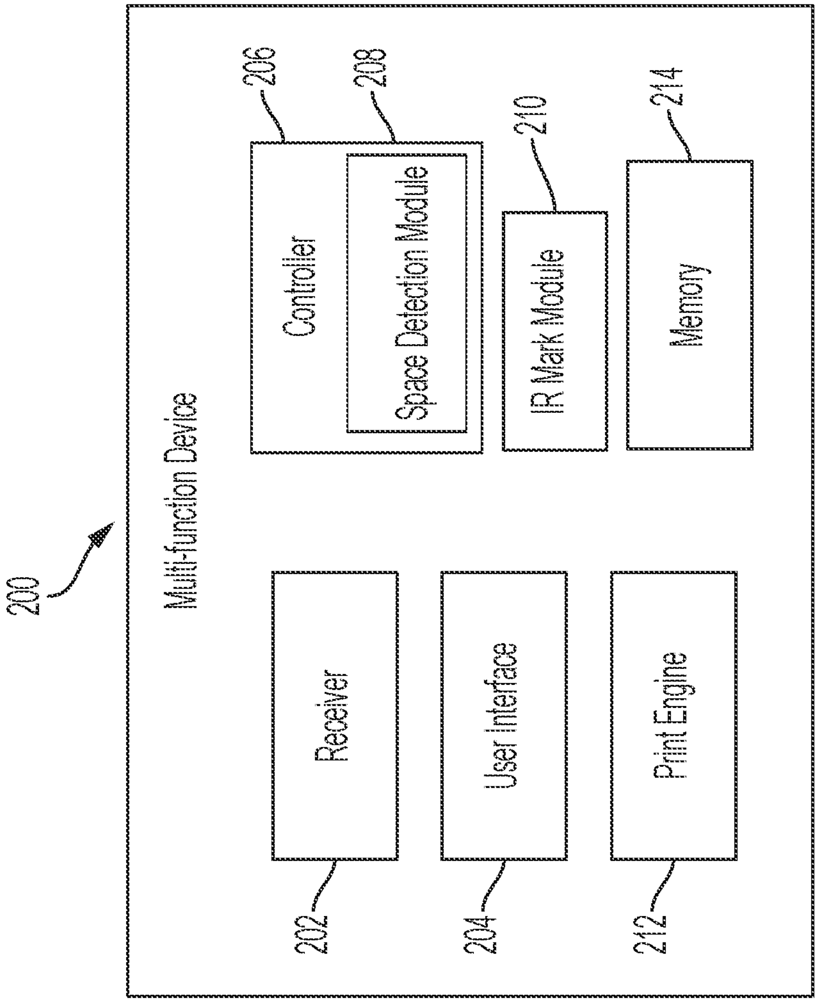
FIG. 2 is a block diagram illustrating various components of a multi-function device, in accordance with an embodiment of the present disclosure.

FIG. 2 is a block diagram illustrating various components of a multi-function device 200 for implementing the current disclosure. As shown, the multi-function device 200 includes a receiver 202, a user interface 204, a controller 206 including a space detection module 208, an IR (Infrared) mark module 210, a print engine 212 (output module) and a memory 214. The components 202-214 are connected to each other via a conventional bus or a later developed protocol. Further, the components 202-214 communicate with each other for performing various functions of the present disclosure. The multi-function device 200 may further include additional component(s) as required to implement the present disclosure. For example, the mufti-function device 200 may include a copier.

Initially, a user submits a document at the multi-function device 200. The document may be submitted by the user for printing, In case of printing, the document submitted is in the form of digital version. But the document can be submitted at the mufti-function device 200 for copying purpose. In such cases, the document can be in physical form. The document includes content in the form of text, image, graphics, or a combination thereof. The document can be a single page or can be a multi-page document. The document may include confidential content or may be otherwise confidential to the user and/or to an organization. The user submits the document for embedding the IR mark in the document. The inclusion of IR mark in the document secures the document and further establishes authenticity/genuineness/originality of the document. The IR mark is included within an IR security patch, wherein the IR security patch represent a pattern to cover/hide the IR mark. The IR mark/IR security patch may be located anywhere in the document such as, top right corner or bottom right corner.

Figure 4A:
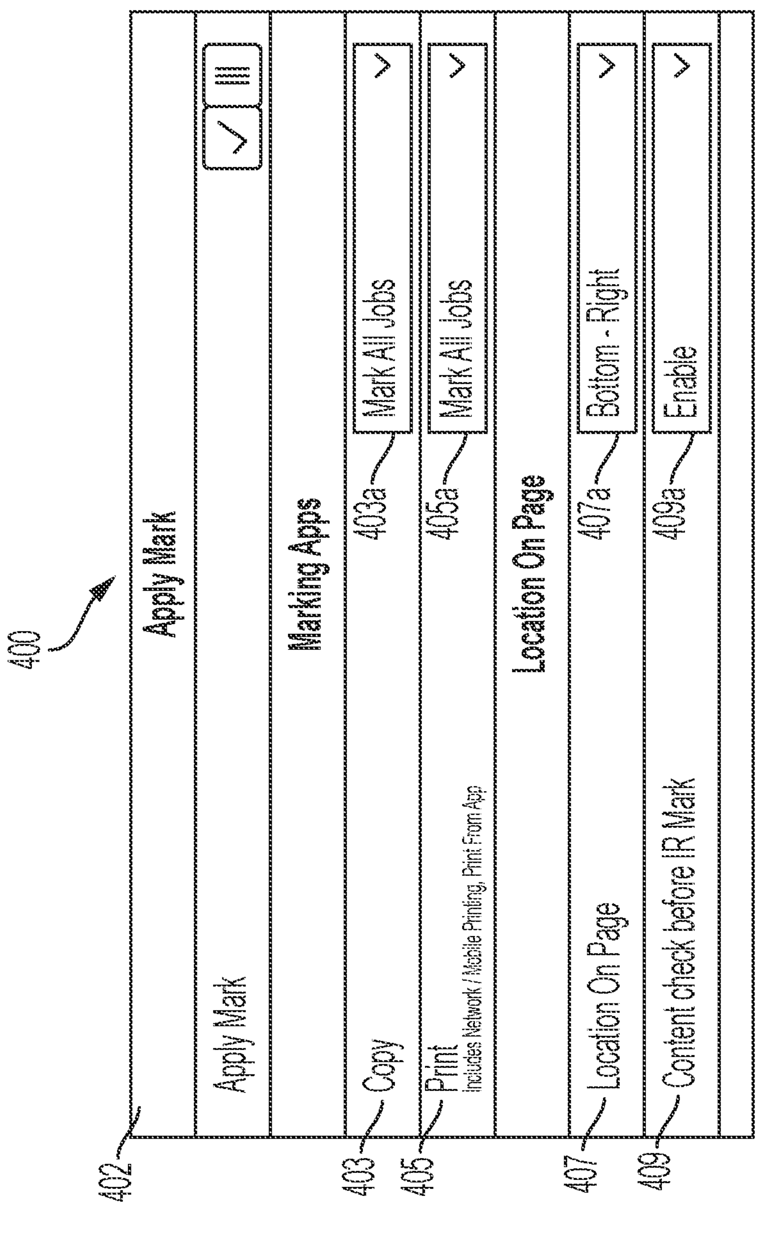

The user submits the document at the multi-function device 200 which is received by the receiver 202. Once the document is submitted at the multi-function device 200, a user interface 204 is provided to the user. The user interface 204 includes options related to IR marks. For example, the user interface 204 allows the user to input which job he wishes to apply IR mark, where he wishes to add IR mark on a page of the document and so on. In context of the current disclosure, the user interface 204 includes a pre-defined option such as "content check before IR mark". The option allows the user to check whether the desired portion where the IR mark needs to be embedded include any content or not. The selection of the option allows the user to know whether the desired portion/specified portion includes any content or represents blank space, before embedding the IR mark and this further prevents any content loss because of the addition of the IR mark. One such exemplary snapshot 400 of such user interface such as 402 is shown in FIG. 4A. The user interface 402 includes various options that can be used for applying IR mark in the document. For example, the user interface 402 includes options copy 403, and print 405. For the options 403 and 405, corresponding drop-down menus 403*a* and 405*a* are provided. The drop-down copy menu 403*a* allows the user to select whether he wishes to apply IR mark to all copy jobs. The drop-down print menu 405*a* allows the user to select whether he wishes to apply IR mark to all print jobs. Further, an option "location on page" (marked as 407) is included in the user interface 402. For the option 407, a drop-down 407*a* is provided. The drop-down 407*a* can include multiple options such as bottom right, top right, top left, or bottom left. The user can select any option from the drop-down menu 407*a* and specifies which portion/corner of the document he wishes to embed the IR mark. As clearly seen in FIG. 4A, the user selects the bottom right corner option. The selection of the bottom right option indicates that the user wishes to embed IR mark in the bottom right corner of the document. This way, the user specifies the corner/portion of the document.

In context of the current disclosure, the user interface 402 further includes a new option "content check before IR mark" (marked as 409). A corresponding drop-down menu 409*a* is provided. The menu 409*a* includes options such as enable or disable. The user can select the option enable if he wishes to check content before embedding IR mark in the document. Otherwise, the user can select the option disable. As shown in the snapshot 400, the user selects the option "Enable". This way, the user provides the required input on the IR mark before proceeding further and the inputs are received by the multi-function device 200, specifically by the controller 206 of the multi-function device 200.

The controller 206 then starts processing the document. Based on the input from the user, the controller 206 extracts a specified/required portion of the document. For example, if the user specifies top right corner via the user interface 204, then controller 206 extracts a specified portion/corner of the document. The controller 206 extracts the specified portion of the document for further processing. For example, the controller 206 extracts the specified portion based on a size of the IR mark. The controller 206 passes the extracted portion to the space detection module 208 for further processing. The controller 206 converts the extracted portion of the document into a binary format such as black and white format. The space detection module 208 then identifies if the extracted portion has required blank space such that the IR mark can be embedded without any content loss or the like. The space detection module 208 then checks for blank spaces in the extracted portion of the document. The space detection module 208 calculates a number of white pixels in the extracted portion of the document. Specifically, the space detection module 208 calculates a number of white pixels row-wise and also calculates a number of white pixels column-wise. The space detection module 208 then calculates the sum of white pixels row-wise and column-wise. This way, the total number of white pixels are calculated/obtained in the extracted/specified portion of the document. Based on the white pixels in the extracted portion, the space detection module 208 identifies blank spaces in the extracted portion. The white pixels indicate the presence of the content. The space detection module 208 then passes the outcome to the IR mark module 210. For example, if there are no white pixels, the IR mark module 210 embeds the IR mark in the specified portion of the document such as top right corner of the document. For example, the IR mark module 210 embeds the IR patch before printing on the intermediate processed image data. The IR mark module 210 then passes the document including the IR mark to the print engine 212. The print engine 212 then finally prints the document including the IR mark embedded in the specified portion of the document.

If the space detection module 208 identifies there is not enough blank space in the extracted portion or less blank space in the extracted portion or blank space in the extracted portion, the space detection module 208 calculates an amount of content loss upon embedding the IR mark in the specified portion of the document.

For easy discussion, some exemplary values are shown for better understanding. IR mark Size=M rows×N columns=MN pixels Cumulative sum of horizontal or vertical profile=Total number of white pixels in the intermediate binary image within the area occupied by IR Mark Content loss in the document image corresponding to IR mark (in %)=((Cumulative sum of horizontal or vertical profile)/MN pixels×100)

In one example, IR mark size=10 rows×20 columns=200 pixels

Cumulative sum of horizontal or vertical profile=50 pixels (% Content loss)=(50/200)×100=25%

The space detection module 208 then passes the calculated content loss to the controller 206. The controller 206 displays a notification to the user about the content loss, to the user through the user interface 204 for his input. The notification includes amount of content loss and the details of content loss. The user can provide his input by selecting a desired option. For example, if the user wants to embed the IR mark, he can select Yes option. In that case, the IR mark module 210 embeds the IR mark in the document. Otherwise, the user can select the option "No". This way, the multi-function device 200 manages situations such that no content is lost while embedding the IR mark in the document.

In some implementations, the space detection module 208 automatically identifies blank spaces in other portions of the document if there is not enough blank space in the specified portion of the document, the blank space is less than the size of the IR mark or if there is no blank space in the specified portion of the document. For example, the blank space detection module 208 identifies blank spaces in other corners of the document such as top left corner, bottom right corner, or bottom left corner. Based on the blank space(s) identification, the IR mark module 210 embeds the IR mark in that portion of the document such as bottom right corner. This way, the multi-function device 200 successfully embeds the IR mark in the document without any content loss.

In situations where the blank space detection module 208 identifies that there is not enough blank space or there is no blank space in other portions of the document, then the blank space detection module 208 calculates an amount of content loss for each portion of the document. Based on the calculation, the space detection module 208 selects a portion with minimized content loss for embedding the IR mark. The IR mark module 210 accordingly embeds the IR mark in that identified portion of the document.

The user interface 204 can be used for displaying such as displaying one or more notifications to the user. The user interface 204 further can be used for providing inputs for identifying blank spaces in the document for embedding IR mark. The memory 214 stores one or more IR marks, their respective size information, user details, or other required details for implementing the current disclosure. The details stored in the memory 214 can be retrieved by the controller 206, the space detection module 208, the IR mark module 210 or other modules of the multi-function device 200.

In FIG. 2 different modules such as controller 206, space detection module 208, IR mark module 210 are shown and discussed. But in some implementations, the functionality of modules such as 208 or 210 can be incorporated in the controller 206 and the single controller 206 performs the functionality of the present disclosure for embedding the IR mark.

Figure 3A:
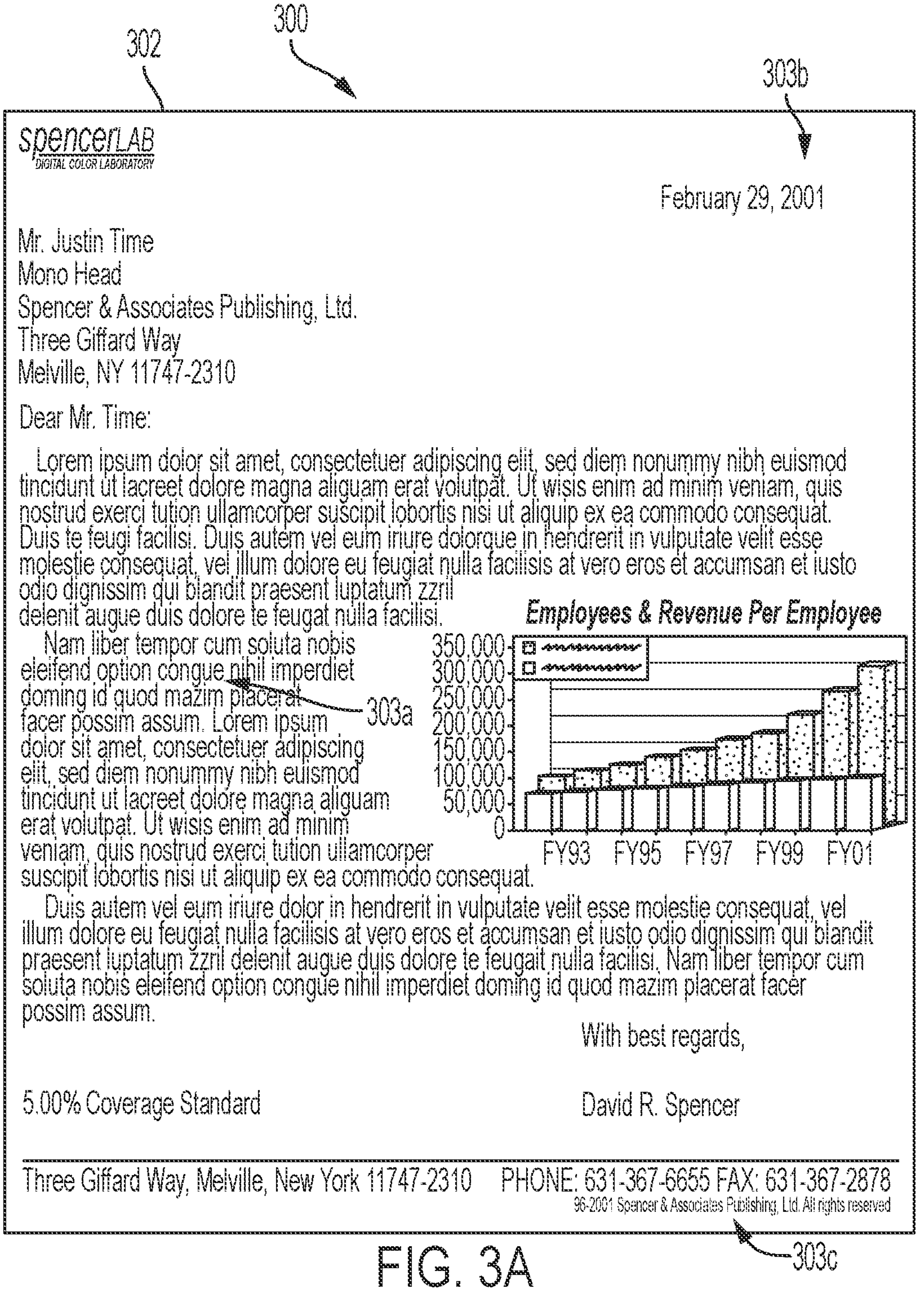
FIGS. 3A-3B are exemplary snapshots according to implementation of existing solutions.
Figure 3B:
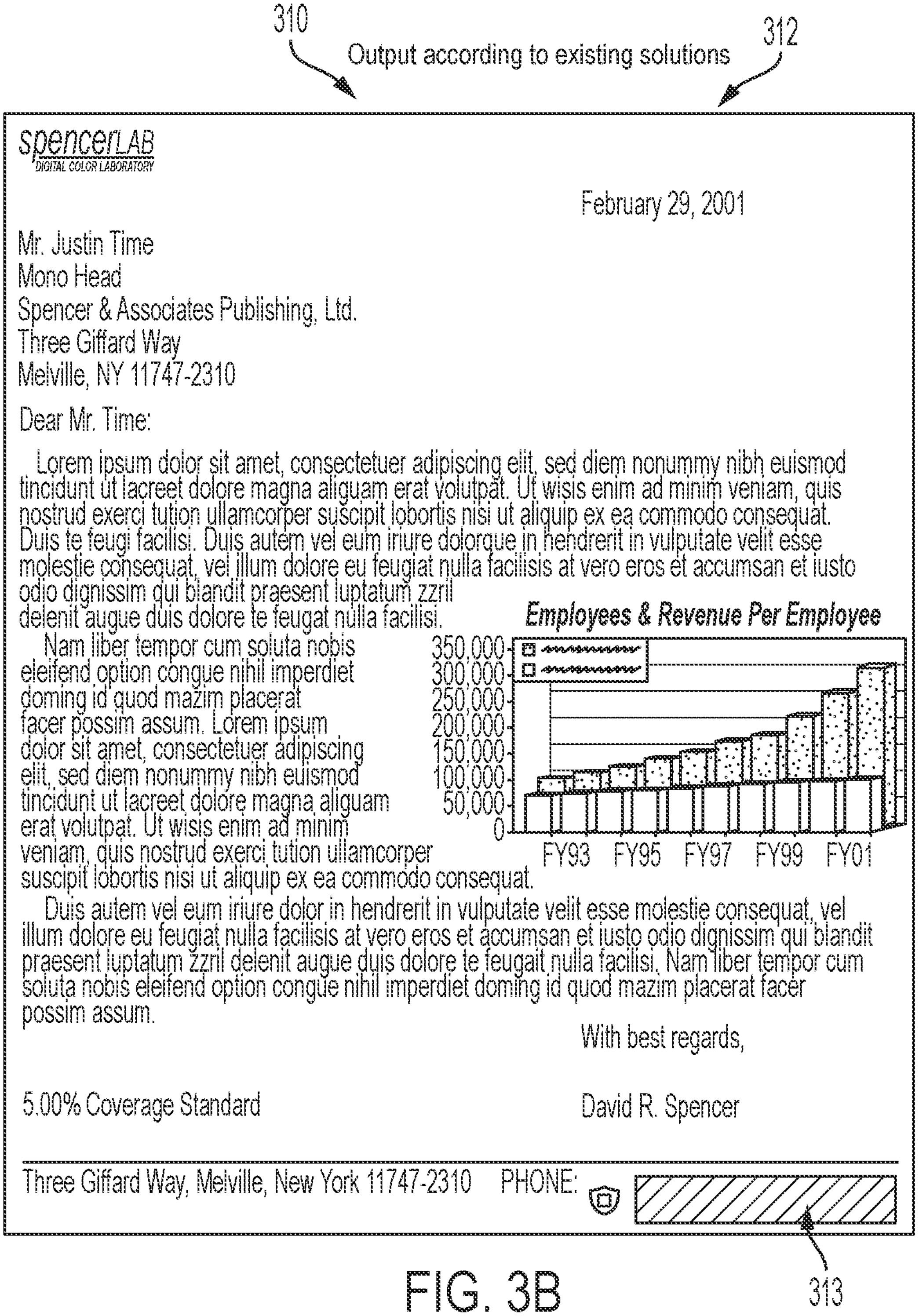

FIG. 3A shows a snapshot 300 of a document 302 submitted for printing at the multi-function device. The document 302 includes content such as 303*a* refers to content in main portion of the page, 303*b* shows content in the top right corner, 303*c* shows content in bottom right corner and so on. According to existing solutions, when an IR mark is embedded in the document 302, an output document 312 is shown in snapshot 310 of FIG. 3B. The output document 312 includes an IR mark 313 as shown in the bottom right corner of the document 312. The document 312 with IR mark 313 is shown FIG. 3B. According to these existing solutions, some content in the bottom right corner 303*c* is lost as can be clearly seen from FIG. 3B.

Figure 4C:
Figure 4D:
Figure 4E:
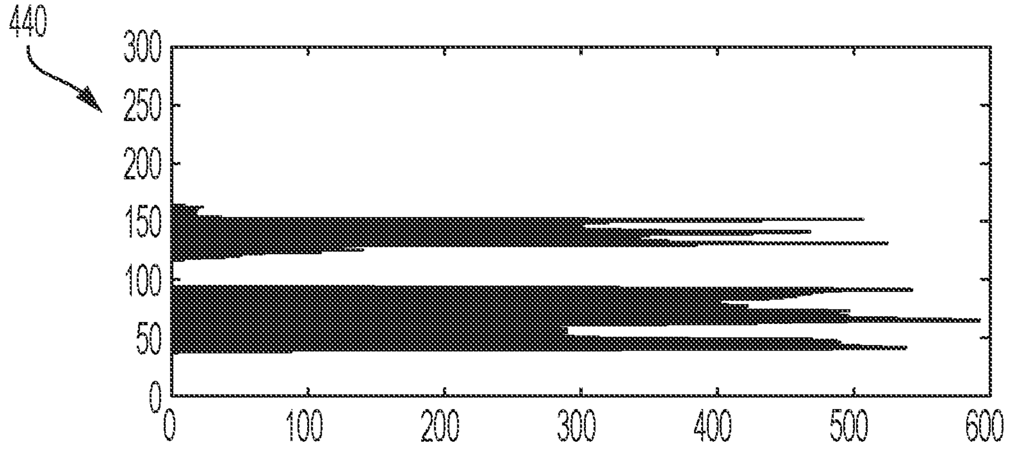
Figure 4F:
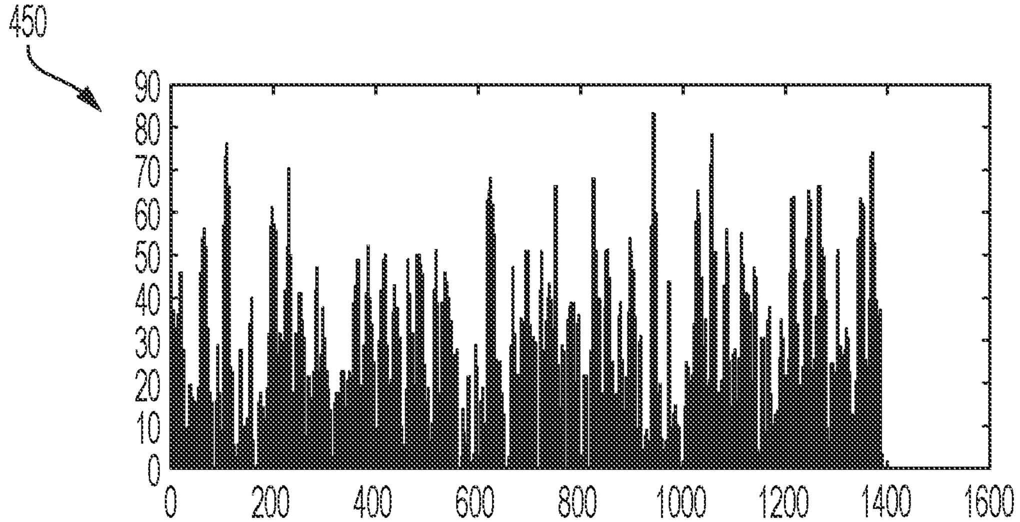

FIG. 4B shows a snapshot 410 of a document 412 submitted for printing. As can be seen, the document 412 includes content. According to the user input, bottom right corner is the desired portion where the user wishes to embed the IR mark. As further shown in FIG. 4C, a snapshot 420 of bottom right corner 422 of the document is extracted, This is further converted into binary format. The extracted bottom right corner in binary format 430 is shown in FIG. 4D. The methods and systems implement blank space identification before embedding the IR mark, here white pixels calculation is performed in the extracted portion according to simple projection profile method. Histogram 440 of white pixels row-wise in the extracted portion i.e., bottom right corner is shown in FIG. 4E. Similarly, Histogram 450 of white pixels column-wise in the extracted portion is shown in FIG. 4F, The histograms 440 and 450 indicate the presence of the content in the extracted portion. According to the projection method, calculated area is 33924 (no. of 1's in snapshot 430 of FIG. 4D). The total number of white pixels (1's) in the binary image area is 33924. This indicates the extracted/cropped bottom right area has content, In such cases, the IR mark may not be embedded in the bottom right corner of the document and thus avoids content loss situations.

Figure 5A:
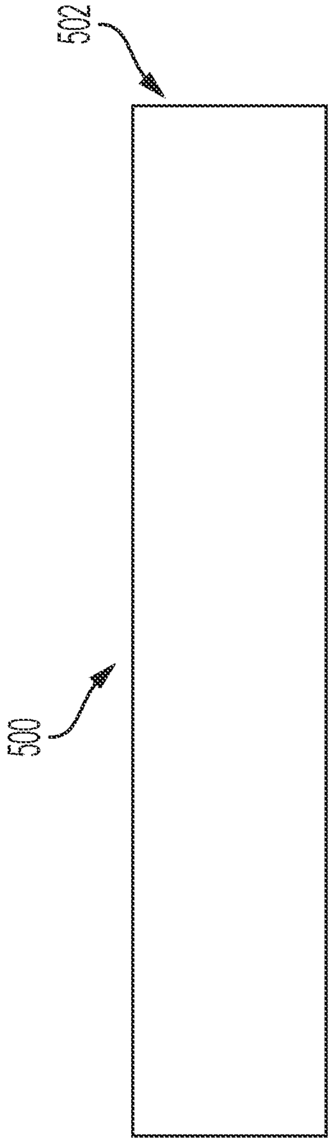
FIGS. 5A-5E are exemplary snapshots, in accordance with an embodiment of the present disclosure.
Figure 5B:
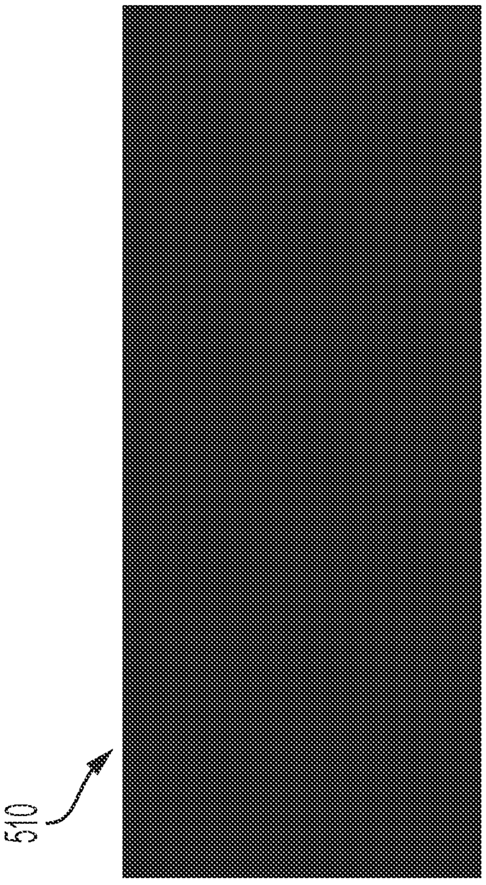
Figure 5C:
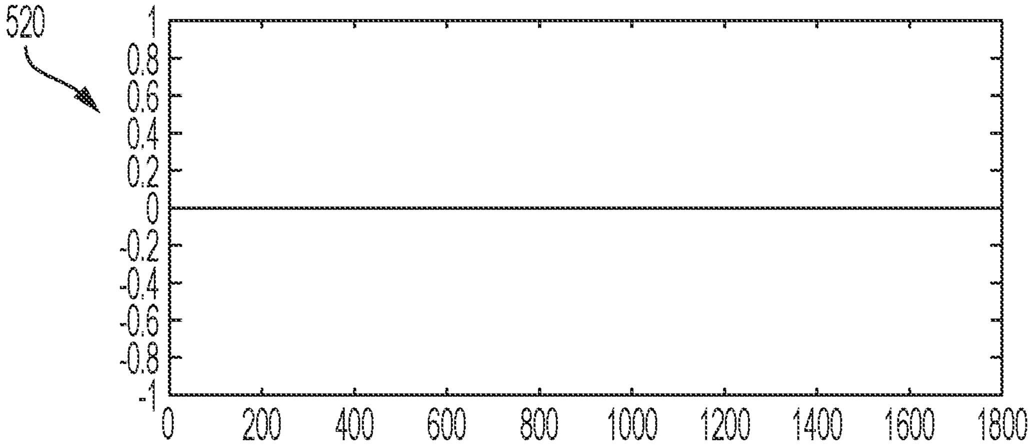
Figure 5D:
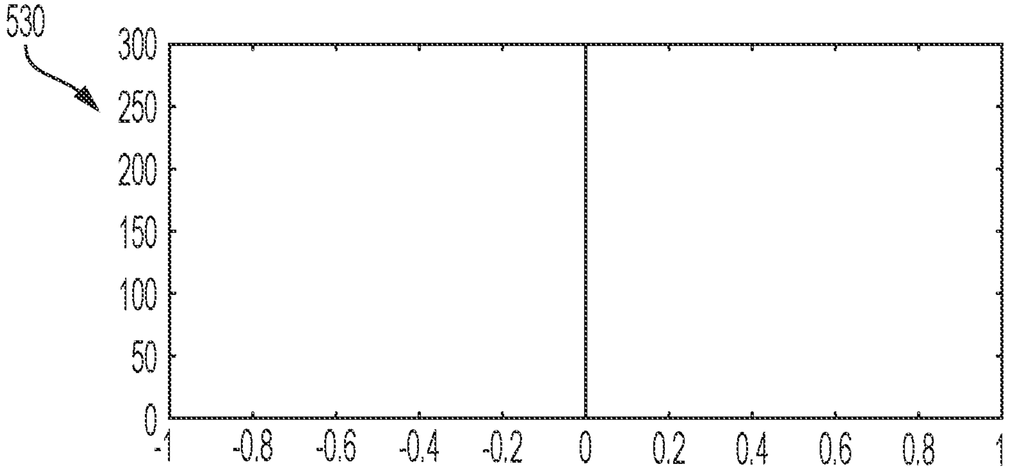
Figure 5E:
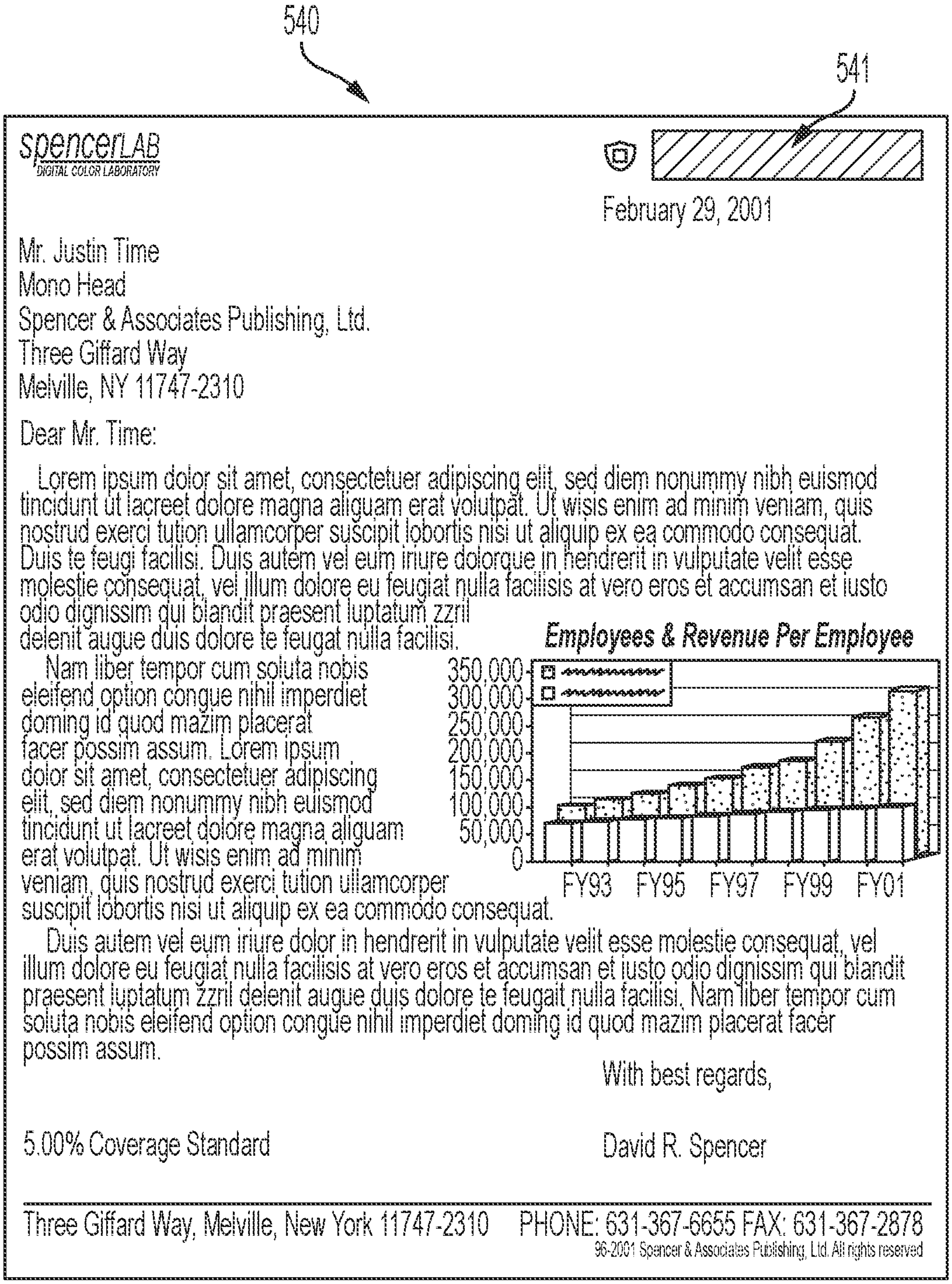

FIG. 5A shows another extracted portion 502 (such as top right corner) of the document in the form of snapshot 500. The binary format (marked as 510) of the extracted portion 502 is shown in FIG. 5B. Histogram 520 of white pixels row-wise in the extracted portion 502 is shown in FIG. 5C. Similarly, Histogram 530 of white pixels column-wise in the extracted portion 502 is shown in FIG. 5D. The histograms 520 and 530 indicate that no content is present in the extracted portion of the document i.e., top right corner. Here, the IR mark can be embedded in the top right corner of the document, When an IR mark is embedded in the document 312, none of the content is lost as seen in FIG. 5E. As further shown in the snapshot 540 of FIG. 5E, the IR mark 541 is embedded in the output printed document without any loss of the content. According to simple projection profile method, the method calculates the number of white pixels. The method calculates Area X=0 (number of 1's in the binary image 530). The total number of white pixels (1's) in the binary image 530 area is "0". The cropped top right area has no content. The method prioritizes the top right location and prints the IR-mark.

Exemplary Flowchart

Figure 6:
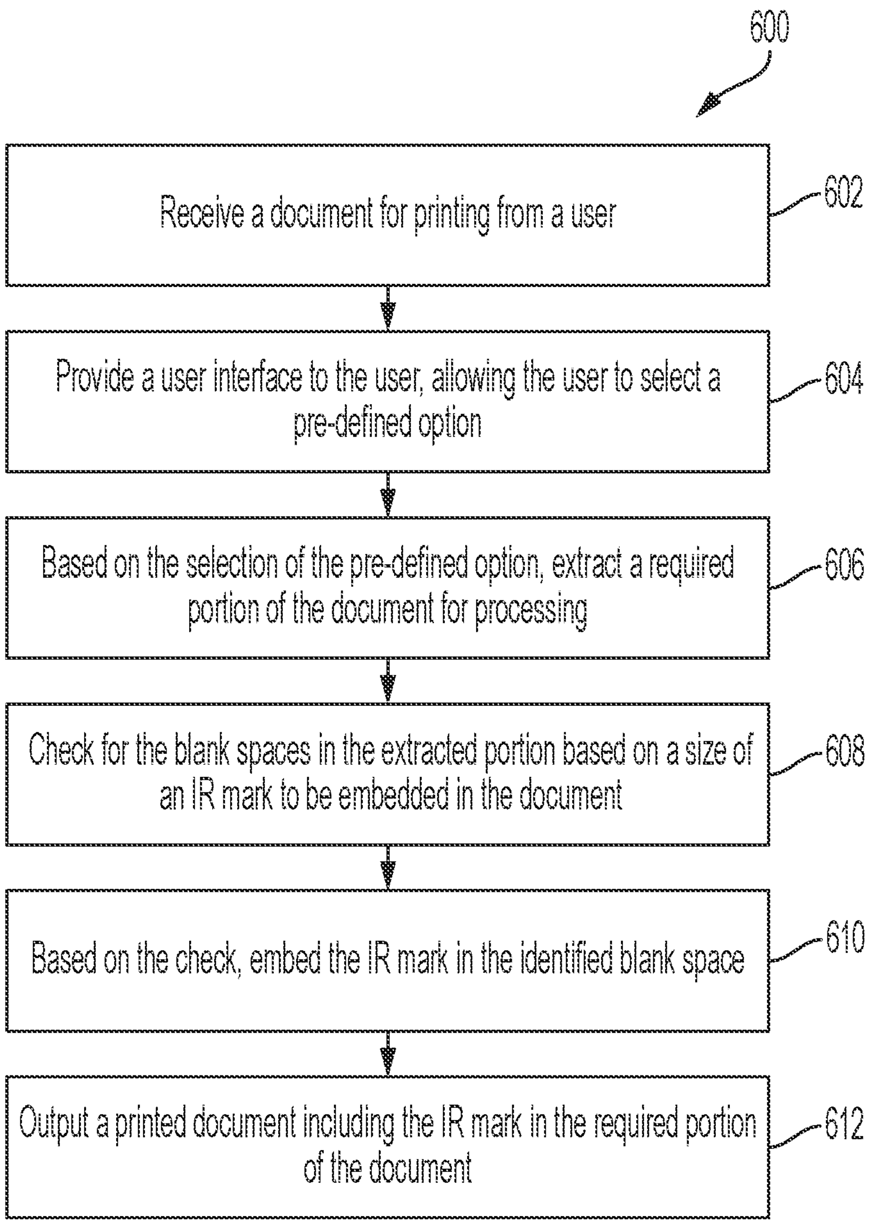
FIG. 6 is a method flowchart for identifying blank spaces in documents for embedding an IR mark in the documents.

FIG. 6 is a method flowchart 600 for identifying blank spaces in a document for embedding an IR mark, specifically, FIG. 6 is a method flowchart 600 for identifying blank spaces in corners of the document before embedding the IR mark hi a desired corner of the document. The method 600 may be implemented at a multi-function device, such as the multi-function device 102 of FIG. 1, the multi-function device 200 of FIG. 2. However, the method 600 can be implemented at any equivalent device with printing and/or copying functionality, and so on.

The method 600 begins when a user wishes to add an IR mark in a document. The document includes content in the form of image, text, graphics, or a combination thereof. The document can be a single page or can have multiple pages. The IR mark can be added on a specific page of the document or all pages of the document. The IR mark can be added based on an input from the user or can be added based on pre-defined settings at the multi-function device 102. The document includes confidential content or can be otherwise confidential to the user and/or organization. The IR mark can be text-based security marks. The IR mark is embedded/included within an IR security patch. Moreover, the IR security patch including the IR security mark may be located at the top right corner or the bottom right corner of the document.

The user selects the document for printing. The document for printing can be selected via a print driver of a computing device. The document for printing can be directly selected at the multi-function device. The document for printing can be selected via other ways such as USB, cloud, network location, server location or the like. The user can access these at the computing device or directly at the multi-function device. These are few examples for submitting the document for printing but other ways for selecting and submitting the document as known or later developed can be implemented. The document for printing is received from the user at 602.

Upon submitting the document, a user interface is provided to the user. The user interface allows the user to input one or more print attributes required for printing the document. The user interface further allows the user input IR mark related items such as desired corner. In context of the current disclosure, the user interface includes a pre-defined option such as content check before IR mark, at 604. The user can enable or disable the option, to check content before embedding the IR mark. The option allows the user to check for appropriate and required blank space in the document before embedding the IR mark. Upon enabling the option, the multi-function device 102 uses the known IR-mark size to find blank space in the document before embedding the IR mark. The inclusion of this option prevents loss of content such as important data because of inclusion of IR mark in the document. The option can be enabled or disabled by the user. In context of the current disclosure, the user enables the option.

Based on the selection of the pre-defined option, a required portion of the document is extracted at 606. For example, if the user inputs top right corner, then top right corner of the document is extracted. The top right corner is extracted based on the size of the IR mark, Once extracted, top right corner of the document is processed. To this end, blank spaces in the extracted portion is identified based on a size of the IR mark to be embedded in the document at 608. To identify the blank space, a total number of white pixels in the extracted portion is calculated. The number of white pixels is calculated row-wise, and the number of the white pixels are calculated column-wise. Then, sum of the white pixels row-wise and the white pixels column-wise is obtained. The white pixels calculation/determination help identify whether the desired portion such as top right corner includes content or not.

Based on the check, the IR mark is embedded in the identified blank space at 610. For example, if the identified blank space is enough for embedding the IR mark, the IR mark is embedded in the document. In another example, if the identified blank space is equal to or greater than the size of the IR mark, the IR mark is embedded in the document in the top right corner of the document. Once embedded, the document is printed. Finally, a printed document is output including the IR mark in the required portion of the document at 612.

If the extracted portion of the document does not have enough blank space, then amount of content loss is calculated as discussed above. Then, a notification is displayed to the user indicating the amount of content loss. The content loss can be shown in any pre-defined format such as percentage, or the like. In some implementations, the content loss along with what content may be lost can be shown to the user. If the user is OK with the content loss, then, the IR mark may be embedded in the top right corner of the document. For example, the user may say OK, when the content lost because of IR mark is not very important or confidential for the user, The IR mark is embedded based on an input from the user on the displayed notification related to the content loss.

If the extracted portion does not have blank space, the method 600 proceeds forward. The method 600 automatically proceeds with identifying blank space in other portions of the document. Here, other portions of the document are extracted such as top left corner, bottom right corner, bottom left corner, or the like. Based on the blank spaces in other portions of the document, the IR mark can be embedded. For example, if there is blank space in the bottom left corner, the IR mark can be embedded. In another example, if there is no enough blank in other portions of the document, then IR mark can be embedded in the portion where content loss is minimum.

The method 600 calculates an amount of content loss in one or more scenarios, For example, the method 600 calculates an amount of content loss if there are no blank spaces in the specified corner of the document. In another example, the method 600 calculates an amount of content loss if there are no blank spaces in other portions of the document. In further example, the method 600 calculates an amount of content loss if the identified blank spaces are less than the size of IR mark in specified portion or in the other portions of the document.

In cases where the blank spaces in the specified portion are not enough, the method 600 proceeds with calculating amount of content loss and proceeds with embedding IR mark based on an input from the user. In other examples, where the blank spaces in the specified portion are not enough, the method 600 automatically proceeds with identifying blank spaces in other portions of the document and can embed the IR mark accordingly based on an input from the user. The method 600 can be implemented in any possible manner, without limiting the scope of the disclosure.

The method 600 is discussed wrt identifying blank spaces in one corner of the document but the method 600 can be implemented for identifying blank spaces in more than one corner/portion of the document.

The method 600 can be implemented in the form of a non-transitory computer-readable medium storing instructions, which when executed by one or more processors cause the one or more processors to implement the method blocks 602-612, as discussed herein.

The present disclosure discloses methods and systems for identifying blank spaces in document, specifically, in corners of the document for embedding the IR marks. The methods and systems prevent loss of important content like logos, titles, date, author information, contact details etc. The methods and systems don't require any manual effort to check each page for enough space to print IR mark. The methods and systems can be easily implemented in existing multi-function devices. The methods and systems further provide better user experiences. The methods and systems can be incorporated in user interfaces of the multi-function device, be in the form of local user interface or web-based user interface.

The methods and systems search for white space using simple projection profile method. The simple projection profile method uses binary image to calculate the number of white pixels. The simple projection profile method includes i). horizontal profile—sum of all row pixel values are calculated and ii). vertical profile—sum of all column pixel values are calculated. The methods and systems calculate a final area (calculate number of white pixels) based on the sum of horizontal profile and vertical profile. Before placing the IR mark, the area is cropped and analyzed using "Simple Projection Profile" method.

If there is not enough space in all the corners of the document to print the IR mark, then based on the calculated data loss percentage in each position, the methods and systems print the IR mark in the least data loss position.

To avoid time consuming operation for detecting the blank space in each corner, the methods and systems use multi-threading to perform the "Simple projection profile" method in each corner of the page. Each thread performs blank space detection and calculates the area.

The methods and systems avoid content loss while securing documents using IR marks. The methods and systems embed IR mark in the documents such that important content such as Author, date, titles, logos is not lost. The methods and systems propose a way to detect blank spaces in the document before marking IR marks to avoid the loss of important content in the document.

The methods and systems embed the IR mark such that there is no content loss or content loss is minimized.

This disclosure proposes methods and systems or determining appropriate areas that are blank for embedding the IR mark.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above-described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as receiving, calculating, identifying, checking, detecting, or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMS), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in a transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for identifying blank spaces in a document for embedding an Infrared (IR) mark in the document, the method comprising:

receiving the document from a user for at least one pre-defined operation;

providing a user interface to the user, allowing the user to select a pre-defined option;

upon selection of the pre-defined option, receiving inputs from the user on the IR mark;

based on the inputs from the user, extracting a specified portion of the document for processing;

checking for the blank spaces in the extracted portion based on a size of the IR mark to be embedded in the document, wherein the size of the IR mark is determined based on calculating a total number of white pixels in the extracted portion of the document;

based on the check, embedding the IR mark in the identified blank spaces in the specified portion of the document; and outputting a final document comprising the IR mark in the specified portion of the document.

2. The method of claim 1, wherein the pre-defined option comprises an option to check for blank spaces in at least one portion of the document.

3. The method of claim 1, further comprising, calculating a number of white pixels row-wise in the extracted portion of the document.

4. The method of claim 1, further comprising, calculating a number of white pixels column-wise in the extracted portion of the document.

5. The method of claim 3 or 4, further comprising, calculating a total number of white pixels based on the number of white pixels row-wise and the number of white pixels column-wise.

6. The method of claim 5, further comprising, identifying whether the extracted portion comprises the required blank spaces, based on the number of white pixels row-wise and the number of white pixels column-wise.

7. The method of claim 1, further comprising, automatically identifying blank spaces in other portions of the document, if there are no required blank spaces in the specified portion of the document.

8. The method of claim 1, further comprising, calculating an amount of content loss in one or more scenarios comprising: (i) if there are no required blank spaces in the specified portion of the document, (ii) if there are no blank spaces in other portions of the document, or (iii) if the identified blank spaces are less than the size of IR mark.

9. The method of claim 8, further comprising, displaying a notification to the user about the content loss in the document.

10. The method of claim 9, further comprising, embedding the IR mark in the processed document based on an input from the user on the notification.

11. The method of claim 1, wherein the pre-defined operation is one of: printing, and/or copying.

12. A multi-function device for identifying blank spaces in a document for embedding an Infrared (IR) mark, the multi-function device comprising:

a user interface for:

allowing a user to select a pre-defined option, wherein the pre-defined option allows the user to check for content loss before embedding the IR mark in the document; and allowing the user to provide inputs related to the IR mark; and a controller for:

receiving the document from the user for at least one pre-defined operation;

based on the selection of the pre-defined option, receiving inputs from the user on the IR mark;

extracting a specified portion of the document for processing;

checking for the blank spaces in the extracted portion based on a size of the IR mark to be embedded in the document; and based on the check, embedding the IR mark in the identified blank spaces; and an output module for outputting a final document comprising the IR mark in the specified portion of the document.

13. The multi-function device of claim 12, wherein the controller calculates a number of white pixels row-wise.

14. The multi-function device of claim 12, wherein the controller calculates a number of white pixels column-wise.

15. The multi-function device of claim 13 or 14, wherein the controller identifies whether the extracted portion comprises the required blank spaces, based on the number of white pixels row-wise and the number of white pixels column-wise.

16. The multi-function device of claim 12, wherein the controller automatically identifies blank spaces in other portions of the document, if there are no required blank spaces in the specified portion of the document.

17. The multi-function device of claim 12, wherein the controller calculates an amount of content loss in one or more scenarios comprising: if there are no blank spaces in the specified portion of the document, if there are no blank spaces in other portions of the document, or if the identified blank spaces are less than the size of IR mark.

18. The multi-function device of claim 17, wherein the user interface displays a notification to the user about the content loss in the document.

19. The multi-function device of claim 18 further comprises an IR mark module for embedding the IR mark in the processed document based on an input from the user on the notification.

20. A method for identifying blank spaces in a document for embedding an Infrared (IR) mark, the method comprising:

receiving the document for printing from a user;

providing a user interface to the user, allowing the user i) to select a pre-defined option to check for blank spaces in one or more corners of the document, and ii) to provide IR mark-related input;

based on the user's input, extracting a specified corner of the document for further processing;

calculating a number of white pixels row-wise in the specified corner of the document;

calculating a number of white pixels column-wise in the specified corner of the document;

based on the above calculations, identifying whether the extracted corner comprises blank spaces for embedding the IR mark;

based on the identification, embedding the IR mark in the specified corner of the document; and outputting a printed document comprising the IR mark in the specified corner of the document.

21. The method of claim 20, further comprising, automatically identifying blank spaces in other portions of the document, if there are no required blank spaces in the specified corner of the document.

22. The method of claim 20, further comprising, calculating an amount of content loss in one or more scenarios comprising: if there are no blank spaces in the specified corner of the document, if there are no blank spaces in other portions of the document, or if the identified blank spaces are less than the size of IR mark.

* * * * *